D. LAKE.
CLUTCH.
APPLICATION FILED JUNE 15, 1916.
1,234,776.
Patented July 31, 1917.
3 SHEETS—SHEET 1.
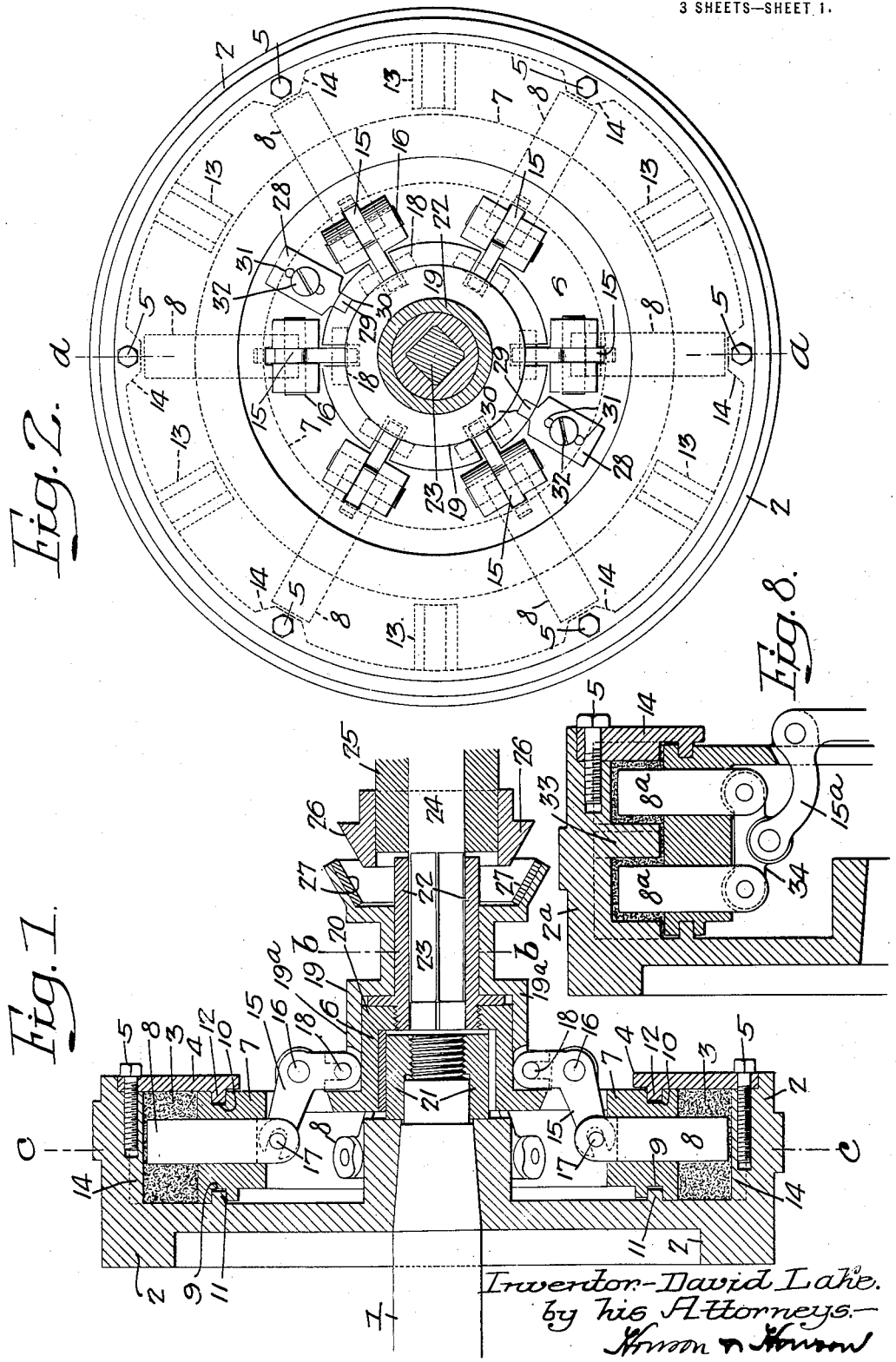
Inventor—David Lake.
by his Attorneys.

D. LAKE.
CLUTCH.
APPLICATION FILED JUNE 15, 1916.
1,234,776.
Patented July 31, 1917.
3 SHEETS—SHEET 2.
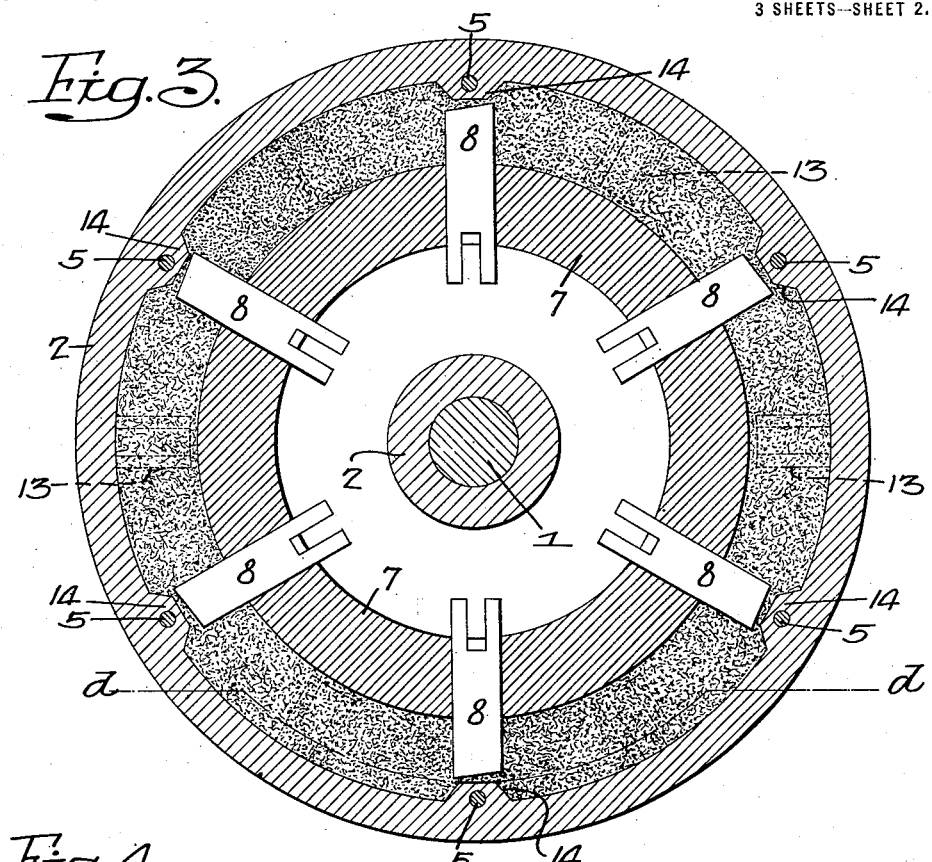
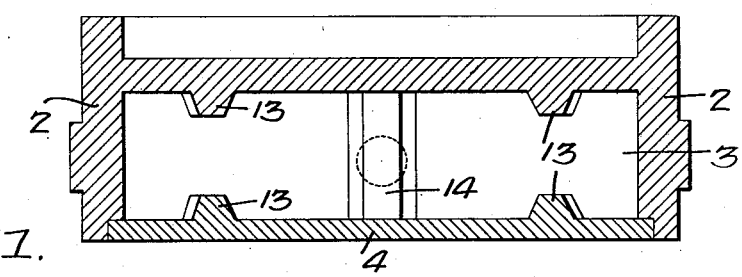
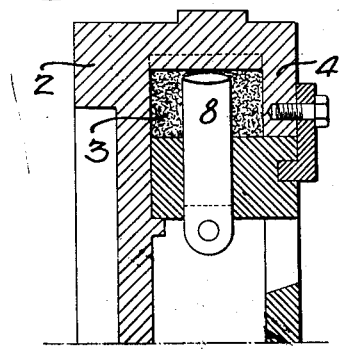
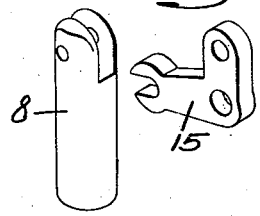
Inventor-
David Lake.
by his Attorneys

D. LAKE.
CLUTCH.
APPLICATION FILED JUNE 15, 1916.

1,234,776.

Patented July 31, 1917.
3 SHEETS—SHEET 3.

Inventor:-
David Lake.
by his Attorneys.-

# UNITED STATES PATENT OFFICE.

DAVID LAKE, OF NORRISTOWN, PENNSYLVANIA, ASSIGNOR TO THE L. & H. CLUTCH CO., OF NORRISTOWN, PENNSYLVANIA, A CORPORATION OF PENNSYLVANIA.

CLUTCH.

1,234,776.   Specification of Letters Patent.   Patented July 31, 1917.

Application filed June 15, 1916. Serial No. 103,912. REISSUED

*To all whom it may concern:*

Be it known that I, DAVID LAKE, a citizen of the United States, and a resident of Norristown, county of Montgomery, State of Pennsylvania, have invented certain Improvements in Clutches, of which the following is a specification.

My invention relates to certain improvements in fluid clutches in which the movement of a rotating element is transmitted to a rotatable driven element through a fluid mass.

One object of my invention is to utilize the resistance, which is offered by a fluid plastic composition to displacement of its mass, when arranged between a driving and a driven member under conditions of power transmission.

A further object of the invention is to provide means for compacting the fluid plastic mass carried by the driving element by the action of centrifugal force, and to provide means carried by the driven element to penetrate the mass at different depths, so as to regulate the speed of the driven element and when the means are fully projected they will enter the dense mass of material and the speed of the driven element will be co-incident with that of the driving element.

My invention relates further to certain details of improvements in the mechanism for carrying out my invention and to the particular compound forming the plastic mass.

Figure 9:
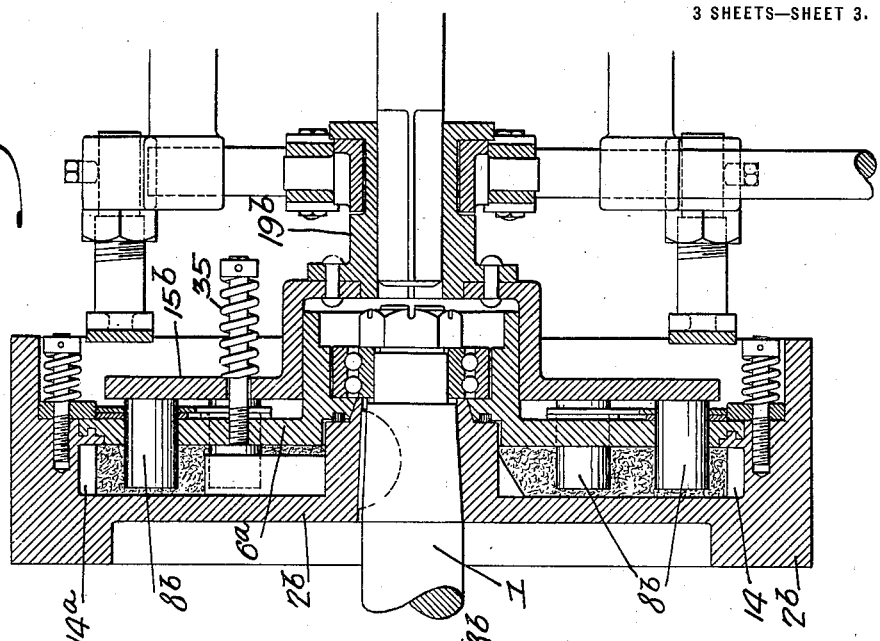
Figure 10:
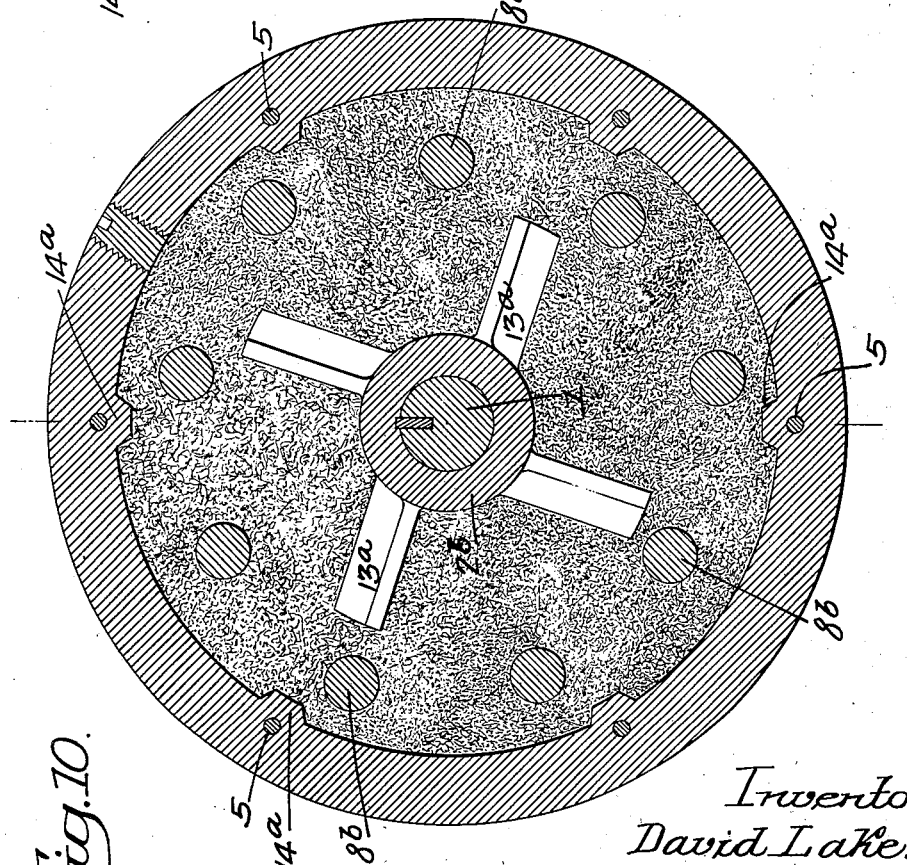

In the accompanying drawings:—Figure 1, is a transverse sectional view of my improved clutch, the section being taken on the line a—a, Fig. 2; Fig. 2, is a sectional view on the line b—b, Fig. 1; Fig. 3, is a sectional view on the line c—c, Fig. 1; Fig. 4, is a sectional view on the line d—d, Fig. 3; illustrating the projections on the casing and the plunger in dotted lines; Figs. 5, 6 and 7, are perspective views of details of the invention; Fig. 8, is a view illustrating my invention designed for a more powerful clutch than that illustrated in Fig. 1; Figs. 9 and 10, are views of a modification of the clutch; and Fig. 11, is a sectional view illustrating a modification of the invention.

In the present instance, 1 is the end of a crank shaft of an automobile engine, although it may be any shaft to which power is applied. 2 is the driving element which is secured to the shaft, as shown in Fig. 1.

In the inner periphery of the driving element is an annular recess 3 formed partly by the driving element and partly by a ring 4 secured thereto by bolts 5. The joints between the two parts 2 and 4 are preferably machined to fit so as to prevent leakage of the fluid element, which, when the driving element is turned at a high speed, will be forced out toward the periphery of the driving element by centrifugal force and, if the joints are not tight, leakage will occur. In some instances the ring 4 may be made integral with the driving element so as to form the recess 3 without joints, as illustrated in Fig. 11.

6 is the driven element having a deep flange 7 which forms the bearing for the plungers 8, which can be projected into the space occupied by the fluid element to any degree desired. In the present instance, the flange is grooved at 9 and 10 to receive the annular ribs 11 and 12, respectively, on the driving element 2 and the ring 4, so that while one part is free to turn independently of the other they are held central by these two ribs. There are six plungers, in the present instance, and they are preferably staggered, as shown, three being out of line with the other three which are alternately arranged so as to prevent a channel being accidentally cut in the plastic fluid element.

The plastic fluid element is placed in the annular recess 3 and is a comparatively thick dense mass consisting, in the present instance, of graphite, glycerin and asbestos fiber in about the proportion of two parts graphite, two parts asbestos and one part glycerin. This mass is of such a consistency that when compacted by centrifugal force it will have sufficient solidity at or near the periphery to resist movement of one element with respect to the other, but when a driven element is partly projected into the mass it will allow the element to move therethrough, and thus transmit motion according to the depth of penetration.

Mechanism is provided for projecting or withdrawing the plungers, preferably in unison, to any distance required so as to regulate the speed of the driven element. When the plungers are entirely withdrawn the driving element turns without imparting motion to the driven element and when the plungers are projected to the full extent then both elements turn as a unit.

Projecting from the side walls of the annular recess 3 are abutments 13, one series being on the driving element and the other on the ring 4 and, in the present instance, there are six of these abutments on each side. Alternating with these side abutments is a series of transverse abutments 14 at the base of the annular recess in the driving element. These abutments retain the plastic fluid element so that it will turn with the driving element while the plungers 8 are engaged by the plastic fluid element and turn the driven element.

Any suitable means may be provided for moving the plungers into and out of the recess for the fluid element. In the present instance, I have shown a bell crank lever 15 pivoted at 16 to lugs on the driven element and one arm of this bell crank lever is slotted to engage a pin 17 on the plunger, while the other arm has a pin 18 which enters a notch in the shifting sleeve 19. This shifting sleeve fits the hub 20 of the driven element and this hub, in turn, fits over the threaded ring 21 secured to the threaded end of the shaft 1.

22 is a coupling screwed into the hub 20 of the driven element and is squared in the present instance to receive the squared end 23 of the driven shaft 24. This shaft is mounted in a bearing 25, in the present instance, on which is secured a conical friction ring 26 with which the friction pads 27 on the shifting sleeve 19 come in contact when the sleeve is withdrawn to the full extent so as to form a brake for the driven element after the plungers have been withdrawn. This construction may be modified without departing from the essential features of the invention.

In order to prevent lateral strains being placed upon the bell crank lever 15, I provide key blocks 28, which are shown clearly in Fig. 7, and these key blocks are secured to the driven element 6 and have elongated keys 29 which are adapted to slots 30 in the flange 19$^a$ of the shifting sleeve 19, and these key blocks are secured to the driven element by pins 31 and a screw 32. The head of the screw overlaps the pins, as clearly shown in Fig. 2, so as to hold them in position. This construction materially strengthens the connection between the key block and the driven element.

In Fig. 8, I have illustrated a type of clutch especially adapted for heavy loads. In this clutch, the plungers 8$^a$ are duplicated, are arranged side by side and are spaced a sufficient distance apart to allow for the insertion of a series of blades 33, which project from the casing of the driving element 2$^a$ and, in the present instance, there are six of these blades, three being inclined in one direction and the other three being inclined in the opposite direction, displacing the plastic fluid element and forcing it into the path of the plungers 8$^a$. Each set of plungers is connected by a cross head 34 and this cross head, in turn, is attached to a bell crank lever 15$^a$.

In Figs. 9 and 10, I have shown another modification of the invention, in which the plungers 8$^b$ are arranged parallel with the shaft 1 and the driven element 6$^a$ forms one wall of the recess for the plastic fluid element. The plungers, in this instance, are attached to a plate 15$^b$, which is, in turn, attached to the shifting sleeve 19$^b$. Springs 35 tend to force the plungers into the recess and the shifter withdraws the plungers. In this instance, blades 13$^a$ project from the driving element 2$^b$ and there are also transverse projections 14$^a$ for causing the plastic fluid element to turn with the driving element.

The action of the clutch is as follows:—When the driven element is at rest, the plungers are entirely withdrawn so that they do not project into the space containing the transmitting plastic fluid material and if the driving element is rotating and it is desired to impart movement to the driven element the plungers are gradually projected into the space containing the transmitting plastic fluid material and, as they are projected, the driven element rotates slowly at first and the speed increases in proportion to the projection of the plungers into the material. These plungers displace the material, owing to the fact that there is a space not only between the ends of the plungers and the casing, but also between the sides of the casing and the plungers, in the present instance, and as the outward movement of the plungers is continued the resistance of the material is increased, as the material becomes denser as it nears the periphery, owing to centrifugal action. When the plungers are projected to their full extent they are in the dense material which holds the plungers, and the driven element to which they are connected will rotate at the same speed as the driving element. The plungers in their projected position do not touch the casing, but motion is transmitted entirely through the dense mass of plastic material. Tests have shown that there is no slip between the driving and the driven elements when the plungers are fully projected into the dense mass of material under normal driving strains. This is due to the fact that the driving element is rotated at a speed sufficient to cause the plastic fluid mass to pack against the inner periphery of the casing and is caused to turn with the casing by the projecting abutments and when the plungers are forced into the dense portion of the mass the plungers and the driven element which carries them must turn with the driving element.

While I have described a particular compound and certain proportions as giving, in my opinion, the best results, other materials and other proportions giving the same results may be used without departing from the essential features of the invention, viz, the use, in the rotating driving element, of a plastic fluid mass which will become so dense, due to centrifugal action, that a plunger, or equivalent, projected into the mass will rotate therewith.

I have shown in Fig. 3 of the drawings, a construction in which six plungers are used, and in Fig. 10, I have shown ten plungers. It will be understood that the number of plungers may be varied without departing from the essential features of the invention. I have found that a clutch having three plungers will accomplish the purpose desired.

The particular plastic composition described herein forms the subject of a separate application filed by me on the 11th day of December 1916, under Serial No. 136,234.

I claim:—

1. The combination of a casing having a recess therein; a plastic fluid mass contained in said recess and forming a power transmitting element; a driven element having means adapted to be projected into the plastic fluid mass so that motion of the driving element will be imparted to the driven element through said mass.

2. The combination of a casing having a recess therein; a plastic fluid mass contained in said recess and forming a power transmitting element; a driven element having plungers adapted to be projected radially into the plastic fluid mass so that motion of the driving element will be imparted to the driven element through said mass according to the depth of penetration of the plungers into the mass.

3. The combination of a casing having a recess therein; abutments in the recess; a shaft to which the said casing is attached; a plastic fluid mass in the recess; a flanged element forming the inner wall of the recess and having movable plungers adapted to penetrate the mass of material in the casing, one of said elements being a driven element and the other a driving element.

4. The combination of a driving shaft; a casing secured to the shaft and having an annular recess therein and having abutments projecting into the recess; a plastic fluid fibrous element having graphite as the base; a driven shaft; a flanged element connected to said shaft and having a series of radial plungers arranged to be projected into the space occupied by the said fluid element; and means for projecting said plungers.

5. The combination in a fluid clutch, of a driving and a driven element, one of said parts having an annular recess for the fluid element; a series of plungers on the other part, said plungers being less in diameter than the width of the recess for the fluid element; and means for moving the plungers so that they will be projected more or less into the recess for the fluid element, said means retaining the plungers in the position into which they are projected.

6. The combination in a fluid clutch, of a driving element and a driven element, one of said parts having a recess for the fluid element and having an abutment at the side and also having transverse abutments alternating with the side abutments; a series of cylindrical plungers carried by the other element, said plungers being less in diameter than the width of the recess for the fluid element; and means for projecting the plungers into the recess and for holding them in the projected position.

7. The combination of a driving element having a hub and a rim; a ring detachably secured to the rim of the driving element and forming, with the said element, an annular recess for the fluid element; a driven element extending into the driving element and having a portion forming the inner wall of the recess and engaging with the rim and ring of the driving element; a series of plungers extending radially through the inner wall of the recess formed by the driven element and carried by the said driven element, said plungers being less in diameter than the width of the said recess; and means for regulating the projection of the said plungers.

8. The combination in a fluid clutch, of a driving and a driven element, one of said parts having a concentric recess for the fluid element; a series of cylindrical plungers carried by the other element and arranged to be projected through the wall of the recess for the fluid element, said plungers being less in diameter than the width of the space for the said fluid element; and means for positively projecting the plungers and for holding the said plungers in the projected position.

9. The combination of a driving element having a recess for the fluid element; a driven element; a series of plungers carried by the driven element and projecting into the recess for the fluid element; a bell crank lever for each plunger; a shifting sleeve engaging one arm of each bell crank lever; and a key block secured to the driven element and engaging the shifting sleeve.

10. The combination of a driving element having a recess for the fluid element; a series of plungers carried by the driven element; and means for moving the plungers, some of said plungers being out of line with the others.

11. The combination in a fluid clutch, of a driving element having a recess near its periphery for the fluid element; a series of radially arranged plungers carried by the driven element and arranged to be projected into the recess for the fluid element, some of said plungers being out of line with the others; abutments on the driving element extending into the recess for the fluid element; and means for operating the plungers to control the speed of the driven element.

12. The combination in a fluid clutch, of a driving shaft; a driving element secured thereto and having a hub and a rim; a ring secured to the rim and forming with the driven element a recess for the fluid element, said parts having abutments projecting into the recess; a driven element having plungers arranged to extend into the recess; and means for actuating the plungers; the driven element having two annular grooves and the driving element and ring each having an annular rib extending into one of the grooves of the driven element.

13. The combination in a clutch, of a driving and a driven element; a plastic fluid mass forming a power transmitting element carried by the driving element; and plungers carried by the driven element and arranged to be projected into the plastic fluid mass through which the power is transmitted.

DAVID LAKE.